Patented Dec. 9, 1941

2,265,283

UNITED STATES PATENT OFFICE 2,265,283

PROCESS OF MAKING POLYMERIZED VINYL ALCOHOL ARTICLES

Willy O. Herrmann, Munich, Germany, Erich Baum, Haifa, Palestine, and Wolfram Haehnel, Munich, Germany, assignors to Chemische Forschungsgesellschaft, m. b. H., Munich, Germany, a corporation of Germany No Drawing. Original application March 3, 1932, Serial No. 596,570. Divided and this application November 21, 1935, Serial No. 50,890. In Germany March 10, 1931

9 Claims. (Cl. 18—54)

This invention relates to a process of making polymerized vinyl alcohol articles and is a division of our application Serial No. 596,570, filed March 3, 1932, now Patent No. 2,072,302.

An object of the invention is to prepare from solutions of polymerized vinyl alcohol, formed articles such as threads, yarn, artificial silk, artificial hair, artificial catgut, horse hair, musical strings, ribbons, tubes, capsules, pellets, etc.

Another object of the invention is to prepare such articles having widely different physical properties.

A further object is to prepare such articles with medicinal and therapeutic properties.

A still further object is to supply the surgical art with an advantageous substitute for catgut, silkwormgut, silk, linen thread, horse hair and so on.

It is well known that aqueous solutions of polymerized vinyl alcohol upon evaporation yield films. We have found that, in spite of the great affinity of polymerized vinyl alcohol for water, aqueous solutions of such alcohol will produce threads, etc., which can be wound after their formation on a reel, drum or other similar device, according to the usual spinning process.

Such articles may be prepared in many ways, as by forming a viscous solution or paste, by dissolving or soaking the polymerized vinyl alcohol in a suitable solvent as, for example, glycol, glycerine, foramide and especially in water preferably containing substances which aid in the evaporation of the water, such as an alcohol, acetone, and the like. From such solutions or pastes, threads, bands, tubes, etc., can easily be made, for example, by causing such solutions or pastes of the proper viscosity and temperature to form drops, from which result the desired threads. This may be accomplished by placing the solution or paste in a container with a perforated bottom. Or, the solution or paste may be forced through nozzles and the expressed threads may, if desired, be treated according to the processes used in the manufacture of artificial silk, such as stretching the thread, influencing the evaporation of the solvent, using a precipitate bath, etc. The solidification of the protruding threads and so on can be promoted by chilling to low temperatures. In general, it is recommended that relatively highly concentrated solutions or pastes be used, and increased temperature and pressure corresponding to the viscosity. However, for the purpose of obtaining resorptive threads, the process may be carried out at low temperatures.

High-molecular polymerized vinyl alcohol may be obtained by saponification of high-molecular polymerized vinyl ester, especially vinyl acetate. Low-molecular polymerized vinyl alcohol may be obtained by saponification of low-molecular polymerized vinyl ester. As criterions for the grade of polymerization are considered the viscosity and solubility of the polymerization products. (See Staudinger, Frey and Starck. Berichte der Deutschen Chemischen Gesellschaft 1927 S. 1783.)

Such articles possess surprisingly great tensile strength, and resistance to fracture. They are especially suitable for the preparation of all kinds of articles which are exposed to high mechanical requirements, and are colorless and transparent, or may be colored by means of pigments or made opaque by means of filling materials. The properties of these articles can be adapted to different purposes through selection of the proper modifications of polymerized vinyl alcohol. In general, high-molecular polymerized vinyl alcohols have better mechanical properties than low-molecular types.

In the presence of cold water for a long time or in the presence of warm water for a shorter time, the articles tend to swell but such swelling is not detrimental, and the tensile strength, and the resistance to fracture are not affected. The tendency to swell may be overcome by the addition of substances which have no affinity for water, by coating the surface of the article with a protective layer, as for example, of a lacquer, or by physical or chemical changes in the surface of the article. The properties may also be modified in many ways by the addition of filling material, softeners, pigments, organic solvents, etc. to the initial solution or paste, or during the spinning process.

Polymerized vinyl alcohol threads produced according to our process are well suited for textile purposes, either as such or in combination with other threads, and in which a new and desirable color effect is possible. Such products may also be used as artificial hair or horse hair.

These threads may also be used in the preparation of material for bandages and other medicinal purposes, and, being non-inflammable, are especially valuable for such purposes.

Such threads are useful as material for sewing, or as closing means, in surgery, and especially for internal stitching as they are far superior to the usual catgut threads, in that, among other things, they are easily sterilized and remain sterilized. The sterilization of catgut raw material presents great difficulties and requires great care, while polymerized vinyl alcohol directly forms sterile threads, or the formed threads can be easily sterilized, if subsequently contaminated. Buttons for the joining of intestines, tubes for stitches in nerves, for draining wounds, and the like, have the same property. In such uses, a more or less slowly soluble and resorptive polymerized vinyl alcohol should be selected according to the need. For surgical purposes, the resorptive polymerized vinyl alcohol threads may be replaced by the non-resorptive forms, and both forms do not cause suppuration nor fistular formation.

The resorptive forms are advantageous substitutes especially for threads formed of catgut, silkwormgut and so on. They are resorbed in a similar manner as said materials. The non-resorptive forms are suitable substitutes for silk, linen threads, catgut and so on as usual in the surgical art. Both forms and their middle forms are useful for the different surgical purposes.

The resorptiveness of the threads, etc. can be varied within wide limits according to the uses of the same. This is possible by selection of the proper polymerized vinyl alcohol, by changes in the solution concentration, or in the solvent, for example, by using different mixtures of solvents and insoluble organic liquids, by the addition of salts, by changes in the working pressure, etc.

Slightly polymerized vinyl alcohol, whose solutions lack the required viscosity for the preparation of the threads, etc. may be used, as the viscosity of a given solution can be increased in a surprising manner by suitable additions, such as borax, and cane sugar, and by means of such additions it is possible to use a given polymerized vinyl alcohol in less concentrated solution than would be ordinarily possible. The properties of the solution may be modified by using a mixture of widely different polymerized vinyl alcohols.

The solvent for the polymerized vinyl alcohol may be water, an organic liquid, or a mixture of water and an organic liquid. Ethylene glycol, butylene glycol, glycerine, formamide, etc., may be used as organic solvents. A mixture of water and glycerine gives a product of good resorptive properties.

The formed articles are especially suitable for therapeutic purposes, and medicinal compounds, in the form of a solution or suspension, may be added. If a solvent is used for the medicinal compound, it is preferable to select one which aids in the evaporation of the water. Disinfectants, substances aiding in granulation, vasomotorial substances, serums and the like may also be added. Thick medicated threads, etc. may be prepared, and these can be cut up in small pieces. Tubular articles can also be made in the form of capsules, in which can be placed other medicines or solutions of medicines.

The threads can also be woven into cloths for therapeutic purposes. Such material may be placed between the injured part of the body and a continuous bandage or cast, as for example a plaster cast or other bandage which is not to be removed, and a more or less lasting therapeutic effect is thereby given to the injured member, which is not ordinarily possible. It is also possible to use such material for bandages, cloths for various medicinal purposes, and the like, and the same will offer a more or less lasting medicinal effect.

Furthermore, it is possible for certain surgical purposes to give the threads different colors, for example, blue or green, in order to facilitate probing for the inserted thread. In such a case, barium sulphate or bismuth compounds may be incorporated with the thread, thereby making the internal threads visible in X-ray photography.

The required resorptiveness for surgical purposes can be realized in many ways, as by using a moderately high polymerized vinyl alcohol, employing a moderate temperature in the spinning process, or by adding to the solution or paste to be worked, a soluble resorptive material such as gelatine, gums, sugars and the like, or substances which can be made soluble by fermentation, for example, albumin, starch, borax, etc.

In accordance with the above, it is possible to adapt the properties of the threads, etc. to many different requirements, and thereby increase the uses of the same, and the various forms of the articles possess good mechanical properties.

*Example I*

A 20% aqueous solution of polymerized vinyl alcohol was heated to about 100° C. and forced through a nozzle of 0.4 mm. diameter. The expressed threads were passed through a stream of heated air and then wound on a suitable form. The threads showed great tensile strength and resistance to fracture.

With a slotted nozzle, ribbons of great tensile strength are formed, and with a tubular nozzle, tubes are formed which may be used in many ways, for example, as artificial skins for sausages and in surgery as drains, or as sleeves for nerve stitches, in place of the usual calves' arteries.

*Example II*

45 parts of high-molecular polymerized vinyl alcohol were worked with a mixture of 40 parts of water and 15 parts of spirit to a homogeneous paste. This paste was inserted in an autoclave, provided with a nozzle of 0.6 mm. diameter, a regulating valve, and a lead for compressed nitrogen. The mass was heated in the closed autoclave for a while at about 130° C. to form a solution of polymerized vinyl alcohol and to make the expressed product free of bubbles. The pressure in the autoclave was increased to about 100 atmospheres and the nozzle valve was opened. The expressed threads were wound while regulating the velocity of the expressed mass by means of the regulating valve, and the drying process was accelerated by means of heated air. Silk-like threads of great tensile strength and resistance to fracture were formed, and the tendency of the same to swell in water was diminished by treatment with formaldehyde vapor, preferably at elevated temperatures. The pressure and temperature of the process may be diminished or increased in accordance with the concentration and condition of the solution, with the result that the usual spinning apparatus can be used.

*Example III*

The process of Example II was repeated, using a paste of 45 parts polymerized vinyl alcohol, 40 parts of water, 15 parts of spirit and 5 parts of the ethyl ester of lactic acid. The threads formed were very flexible.

*Example IV*

The process of Example II was repeated using low-molecular polymerized vinyl alcohol and to the paste of polymerized vinyl alcohol, water and spirit, 0.5 part of iodoform were added. The mechanical properties of the formed threads were not affected and the threads showed iodoform properties.

*Example V*

The process of Example II was repeated using a paste containing low-molecular polymerized vinyl alcohol, and colored by the addition of 0.3% of Mowilith blue. The threads formed had a deep blue color.

*Example VI*

The process of Example II was repeated using a paste containing low-molecular polymerized vinyl alcohol, to which paste two parts of barium sulphate were added. The so formed threads, when used for internal stitching, were visible in X-ray photography. Like results can be obtained by using, in place of barium sulphate, the usual bismuth compounds which are known in the X-ray art.

*Example VII*

The process of Example II was repeated, using a paste containing low-molecular polymerized vinyl alcohol, and 5 parts of gelatine. The formed threads were suitable for surgical purposes and showed good absorptive properties. In the same way, the resorptiveness can be increased by the addition of albumin, gums, starch, sugar, and the like.

*Example VIII*

The process of Example III was repeated with low-molecular polymerized vinyl alcohol at a pressing temperature of about 80° C. and threads useful for surgical purposes were formed with increased resorptiveness.

*Example IX*

The threads obtained according to Example II were exposed for about three hours to the action of formaldehyde vapors at about 100° C. Threads thus treated had little affinity for water.

*Example X*

The threads obtained according to Example II were treated for about eight hours with a stream of nitrogen heated to about 150° C., and the threads had little affinity for water.

*Example XI*

A 30% viscous solution of high-molecular polymerized vinyl alcohol was heated to about 70° C. in a container which was provided with a perforated bottom having holes of about 6 mm. diameter. The viscous mass dropped slowly through the holes, forming long threads.

*Example XII*

A 10% solution of polymerized vinyl alcohol and glycerine was heated to about 100° C. and forced through a nozzle of about 1 mm. opening. The threads formed solidified upon cooling, were very flexible and had great tensile strength.

*Example XIII*

A 10% aqueous solution of polyvinyl alcohol is poured out as a thin layer and evaporated. A thin film is formed. The film is cut into strips of a size of about 0.6 mm. The threads thus manufactured are useful for surgical purposes replacing catgut, silkwormgut and so on.

A polymerized vinyl alcohol solution, as used in the appended claims, includes not only a concentrated solution but also a solution of pasty consistency.

Our invention is not limited to all of the details hereinbefore described, but may be otherwise embodied within the scope of the following claims. Especially the working temperatures may be selected in accordance with the viscosity of the given solution of polymerized vinyl alcohol and the other conditions of working. When working at elevated temperatures the solubility and resorptiveness of the polymerized vinyl alcohol can be diminished. Therefore to ensure certain degrees of solubility we prefer to work at ordinary room temperatures.

We claim as our invention:

1. Process of preparing articles of the class described which comprises heating an aqueous solution of polymerized vinyl alcohol to a temperature of 100° C. to about 200° C., extruding the same through a nozzle and treating the extruded material with warm air to evaporate the solvent and form a thread, tube or the like.

2. Process of preparing articles of the class described which comprises heating a 20% aqueous solution of polymerized vinyl alcohol to a temperature of 100° C. to about 200° C., extruding the same through a nozzle and treating the extruded material with warm air to evaporate the same and form a thread, tube or the like.

3. Process of preparing articles of the class described which comprises making a paste of high molecular polymerized vinyl alcohol, water and spirit, heating to about 130° C. to form a solution, extruding the solution through an orifice to form a thread, tube or the like and supplying warm air to hasten the evaporation of the solvent.

4. Process which comprises preparing a solution of polymerized vinyl alcohol, heating said solution to a temperature of at least 100° C. and up to about 200° C., and forming articles from said solution while maintaining same at a temperature of at least 100° C.

5. Process which comprises preparing a solution of polymerized vinyl alcohol containing water, heating said solution to a temperature of at least 100° C. and up to about 200° C., and forming articles from said solution under conditions to remove water from the formed articles.

6. Process which comprises preparing a solution of polymerized vinyl alcohol containing water, heating said solution to a temperature of at least 100° C. and up to about 200° C., and forming articles from said solution under such conditions that water is removed initially at least from the surface of the formed articles.

7. Process which comprises preparing a solution of polymerized vinyl alcohol containing water, heating said solution to a temperature of at least 100° C. and up to about 200° C., forming articles from said solution and subjecting said articles to dehydrating conditions.

8. Process which comprises preparing a solution of polymerized vinyl alcohol containing water, heating said solution to a temperature of at least 100° C. and up to about 200° C., forming articles from said solution and subjecting said articles to the action of dehydrating vapors.

9. Process of preparing articles of the class described which comprises extruding a solution of polymerized vinyl alcohol, water and spirit through an orifice under conditions to evaporate the solvent to form a thread, tube, or the like, and treating the product with nitrogen to render the same water resistant.

WILLY O. HERRMANN.
ERICH BAUM.
WOLFRAM HAEHNEL.